(12) United States Patent
Forrest

(10) Patent No.: US 6,865,770 B2
(45) Date of Patent: Mar. 15, 2005

(54) FIBER OPTIC COMPONENT CLEANING DEVICE

(75) Inventor: Edward J. Forrest, Marietta, GA (US)

(73) Assignee: Illinois Tool Works, Inc., Glenview, IL (US)

( * ) Notice: Subject to any disclaimer, the term of this patent is extended or adjusted under 35 U.S.C. 154(b) by 331 days.

(21) Appl. No.: 10/191,127

(22) Filed: Jul. 9, 2002

(65) Prior Publication Data

US 2004/0007250 A1 Jan. 15, 2004

(51) Int. Cl.$^7$ ................................................. B08B 1/00
(52) U.S. Cl. ........................................ 15/210.1; 15/231
(58) Field of Search ............................ 15/209.1, 210.1, 15/231; 206/389, 395, 409, 494

(56) References Cited

U.S. PATENT DOCUMENTS

| | | | | |
|---|---|---|---|---|
| 579,850 A | * | 3/1897 | Uhlmann | 34/95.4 |
| 2,585,061 A | * | 2/1952 | Wester, Jr. | 15/231 |
| 2,880,442 A | * | 4/1959 | Shelby | 15/231 |
| 3,613,146 A | * | 10/1971 | Oviatt | 15/231 |
| 4,152,803 A | * | 5/1979 | Gersin et al. | 15/104.94 |
| 4,873,728 A | * | 10/1989 | Bono | 4/233 |
| 6,098,239 A | * | 8/2000 | Vosbikian | 15/228 |

FOREIGN PATENT DOCUMENTS

| TW | 382992 | 5/1988 |
|---|---|---|

* cited by examiner

*Primary Examiner*—Mark Spisich
(74) *Attorney, Agent, or Firm*—Mark W. Croll, Esq.; Donald J. Breh, Esq.; Welsh & Katz, Ltd.

(57) ABSTRACT

A device for cleaning fiber optic components includes a container having an opening with a soft, large work surface formed in a side thereof. The device includes a plurality of cleaning wipes located within the container, allowing the wipes to be fed from the inside of the container through the opening and placed on the work surface for cleaning. A method for cleaning fiber optic components is also disclosed.

8 Claims, 1 Drawing Sheet

FIBER OPTIC COMPONENT CLEANING DEVICE

BACKGROUND OF THE INVENTION

The present invention is directed to a fiber optic component cleaning device. More particularly, the present invention pertains to a fiber optic component cleaning device having a soft, large work surface on its face, integrally stored, disposable face covers, and a method for cleaning fiber optic components.

Fiber optic transmission rates have increased from one gigabyte per second to a contemporary standard of ten gigabytes per second. Several networks predict transmission rates will reach forty gigabytes per second in the near future. Researchers are working to achieve transmission rates on the order of petabytes and terabytes per second.

In order to achieve, maintain, and even surpass these transmission rates, the transmission media (e.g., fiber optic conductors), must be fabricated and maintained to exacting standards and tolerances. During fabrication and manufacturing, fiber optic component end faces frequently become contaminated with dirt, dust, oil, grease, and other debris. End faces also may be dirtied in the course of regular field use. Cleaning the end faces and keeping them free of scratches, burrs, and the like preserves the accuracy of these very high-speed transmission rates.

Numerous forms of devices have been used to clean fiber optic end faces, with differing degrees of success. Paper products and other flaking materials are not preferred because they are subject to linting. Avoiding linting is critical, as fibrous material obstructing an end face can cause loss of laser light transmission. Additionally, paper products cannot be used with a wet-cleaning technique. Wetting paper cleaning products causes them to shred, exacerbating the linting problem.

Other existing cleaning devices enclose woven material cartridge reels, exposing a very small portion of the reel as a cleaning surface. The miniscule size of these surfaces limits the cleaning process of which the devices are capable to short, small strokes. This method may result in damage to an end face, such as scratching. Moreover, the cartridge reel design does not allow for immediate disposal of the soiled cleaning surface. Instead, the dirty material is re-rolled back into the cartridge.

Further, currently available cleaning devices cannot be used in conjunction with both dry and wet cleaning techniques, which are essential to effective end face cleaning. Wet cleaning requires a cleaning surface that allows a component to be drawn through a wet portion to a dry portion. The existing devices' tiny cleaning surfaces provide insufficient area for both wet and dry sections. Current devices also render wet cleaning impractical because winding wet cleaning material back into a cartridge would cause its entire interior mechanism to become moist, potentially sullying the fresh material.

Accordingly, there exists a need for a fiber optic cleaning device with a soft, large cleaning surface. Desirably, such a device leaves no residue on an end face. Such a cleaning device also allows technicians to use a large cleaning stroke, reducing the likelihood of damaging an end face. Most desirably, the larger cleaning surface and disposable cleaning material of such a device allows performance of both wet and dry cleaning techniques. One commercial provider estimates that as many as 18,000 technicians may use this device.

BRIEF SUMMARY OF THE INVENTION

A device for use in cleaning fiber optic components includes a container having an opening with a soft, large work surface formed in a side thereof. Cleaning wipes are located within the container, allowing the wipes to be fed from the container's interior through the opening and placed on the work surface for cleaning.

In a preferred embodiment, the container is formed in a box shape. Preferably, the container is formed of paperboard, cardboard, molded plastic, or electrostatic discharging material.

In the preferred embodiment, the opening is formed in a slot shape. Preferably, the opening is located adjacent to a face of the container on which a work surface is placed. Preferably, the work surface is formed of a non-flaking material. Most preferably, the work surface is made of a tight, closed cell material, or a covered open cell matrix. Preferably, the material is solvent-resistant to attack. A preferable example of such a material is neoprene.

In the preferred embodiment, the cleaning wipes are placed on a roll, and are detachable from adjacent cleaning wipes.

A method of cleaning fiber optic components includes the steps of feeding a cleaning wipe through an opening in a container, placing the wipe on a soft, large work surface on a face of the container for cleaning, and drawing a fiber optic component over the wipe.

The method can further include wetting a portion of the wipe, and drawing the component from the wet portion of the wipe to the dry portion of the wipe. The step of wetting a portion of the wipe may include spraying or otherwise delivering a solvent onto the wipe.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
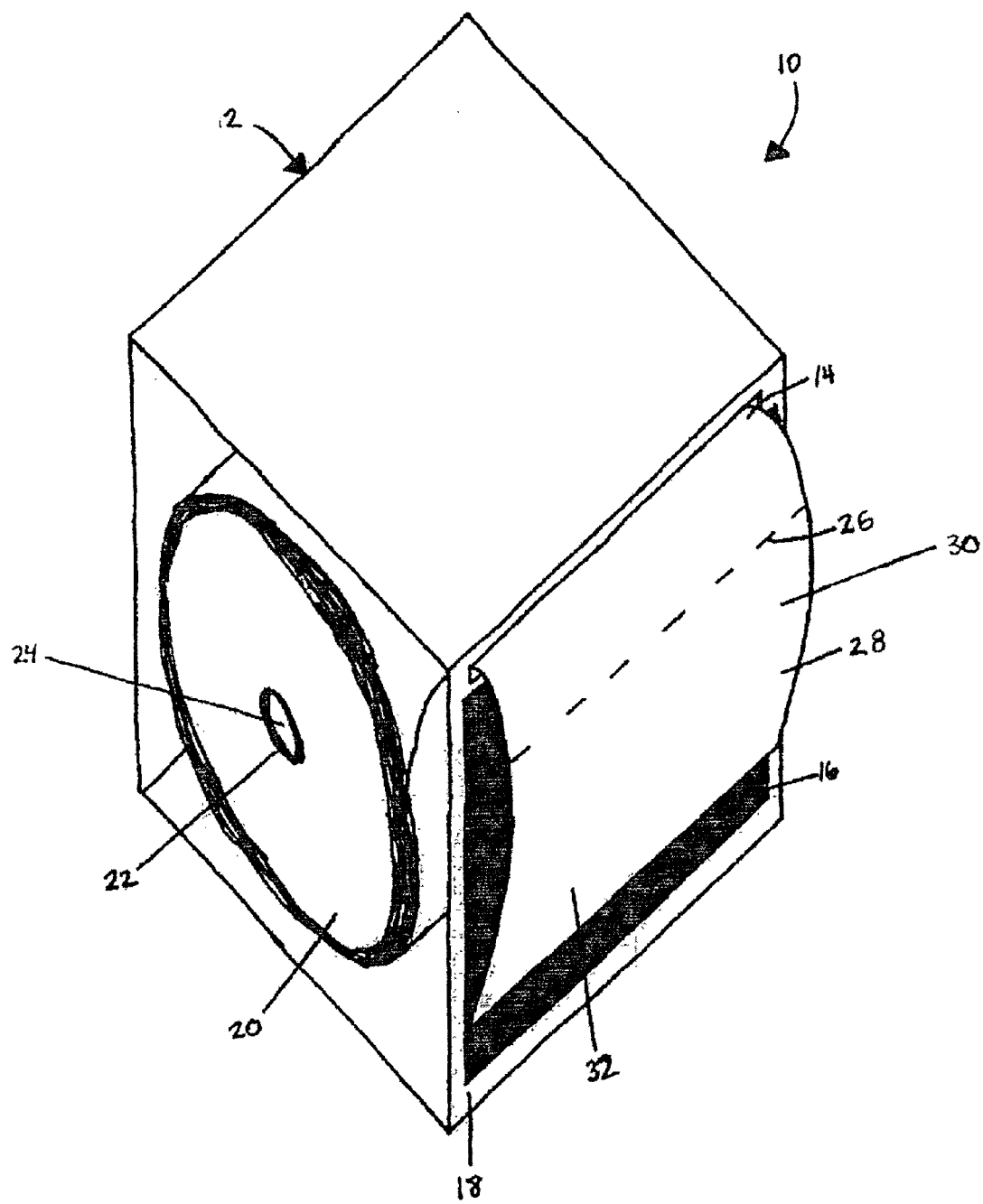
FIG. 1 illustrates a device for cleaning fiber optic components embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular FIG. 1 there is shown a fiber optic component cleaning device 10 in accordance with the principles of the present invention. The cleaning device includes a container 12, having an opening 14 formed in a side or a panel thereof, a soft, large work surface 16 on a face 18 of the container, and a plurality of cleaning wipes 20 located inside the container 12.

The cleaning wipes 20 are fed from the inside of the container 12 through the opening 14, and placed on the work surface 16 for cleaning. In the present embodiment, the container 12 is shaped as a box. The container 12 is preferably formed of paperboard, cardboard, molded plastic, or electrostatic discharging material. The container 12 can, of course, be formed from any other suitable material, as desired. As will be recognized by those skilled in the art, such a container 12 may be made to be disposable or refillable with wipes (as noted below).

In a present embodiment, the opening 14 is in a slot shape. The work surface 16 is located immediately next to the opening 14 on an adjacent panel 18 of the container 12. In a current embodiment, the work surface 16 is formed from a non-flaking material. Preferably, the non-flaking material used on the work surface 16 is a tight, closed cell material. An exemplary tight, closed cell material is the commonly available material neoprene. Alternately, the work surface 16 can be formed from, for example, Buna-N (nitrile butyl rubber) vinyl or a like soft, resilient polymer. Essentially any soft, resilient material can be used. Desirable characteristics for the work surface include liquid impermeability and chemical/solvent resistance. To this end, the work surface can be formed from a soft, resilient material having a protective layer adhered thereto or formed thereon, such as by forming a coextruded material or film.

In a current embodiment, the cleaning wipes 20 are placed on a roll 22. The roll 22 has a core 24. The cleaning wipes 20 have perforations 26, allowing used wipes to be torn from the roll 22 and discarded.

A method of cleaning a fiber optic component includes feeding a cleaning wipe 28 through an opening 14 in a container 12, placing the wipe 28 on the work surface 16, and drawing a fiber optic component over the wipe 28.

As an alternative method of cleaning a fiber optic component, a portion 30 of the wipe 28 may be wetted, so that the component may be drawn from the wet portion 30 to a dry portion 32. The wet portion 30 may be wetted by spraying a solvent onto the wipe 28.

As will be recognized from the figures and the above description, the container 12 has a large, soft work surface 16 attached to a face of the container 12. In that many fiber optic components benefit from the use of both wet and dry cleaning methods, it has been observed that the large work surface 16 allows both wet and dry cleaning methods to be performed. It has also been noted that the large work surface 16 allows technicians to clean components by using less-damaging large cleaning strokes rather than short, small cleaning strokes, which may cause scratching.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, were appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

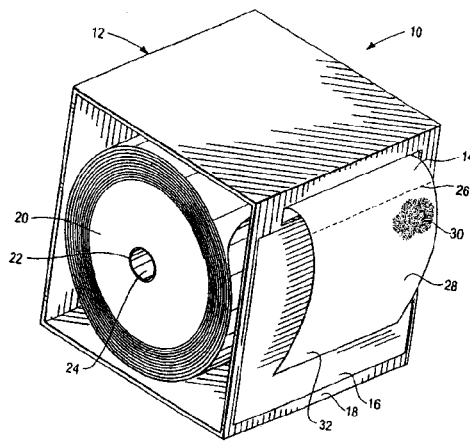

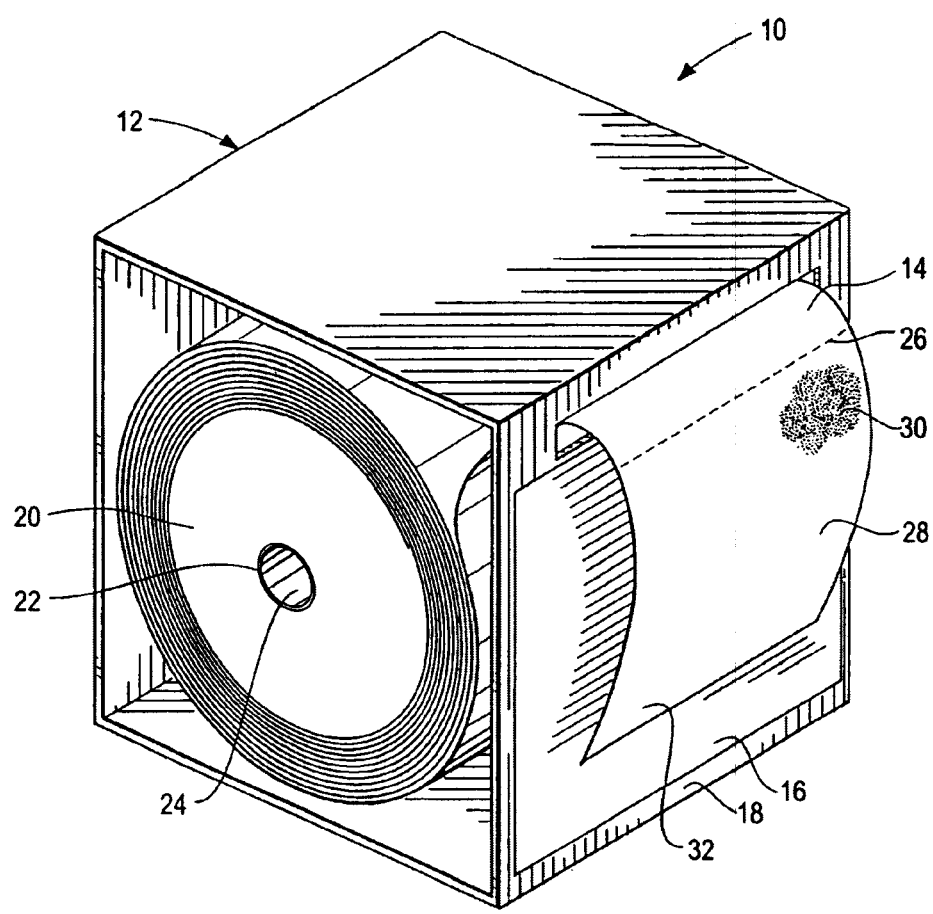

What is claimed is:

1. A fiber optic component cleaning device, comprising:
   a generally rectangular container having a slot-shaped opening on a face thereof;
   a soft, large work surface on the face of the container, extending over substantially the face of the container, the work surface disposed on the surface having the slot-shaped opening, the slot being formed adjacent and between the work surface and an edge of the container; and
   a plurality of cleaning wipes located inside the container, the wipes being fed from the inside of the container through the opening and placed on the work surface for cleaning.

2. The device in accordance with claim 1 wherein the container is formed of paperboard, cardboard, molded plastic, or electrostatic discharging material.

3. The device in accordance with claim 1 wherein the work surface is formed of a non-flaking material.

4. The device in accordance with claim 3 wherein the work surface is formed of a tight, closed cell material, or a covered open cell matrix.

5. The device in accordance with claim 4 wherein the work surface is formed of neoprene.

6. The device in accordance with claim 1 wherein the plurality of cleaning wipes is placed on a roll.

7. The device in accordance with claim 6 wherein the roll includes a core.

8. The device in accordance with claim 1 wherein each of the plurality of cleaning wipes is detachable from adjacent cleaning wipes.

* * * * *

UNITED STATES PATENT AND TRADEMARK OFFICE
CERTIFICATE OF CORRECTION

PATENT NO.    : 6,865,770 B2
DATED         : March 15, 2005
INVENTOR(S)   : Edward J. Forrest It is certified that error appears in the above-identified patent and that said Letters Patent is hereby corrected as shown below:

The title page, should be deleted to appear as per attached title page.

The sheet of drawing consisting of figure 1 should be deleted to appear as per attached sheet.

Signed and Sealed this

Thirteenth Day of June, 2006

JON W. DUDAS
*Director of the United States Patent and Trademark Office*

(12) United States Patent
Forrest

(10) Patent No.: US 6,865,770 B2
(45) Date of Patent: Mar. 15, 2005

(54) FIBER OPTIC COMPONENT CLEANING DEVICE

(75) Inventor: Edward J. Forrest, Marietta, GA (US)

(73) Assignee: Illinois Tool Works, Inc., Glenview, IL (US)

(*) Notice: Subject to any disclaimer, the term of this patent is extended or adjusted under 35 U.S.C. 154(b) by 331 days.

(21) Appl. No.: 10/191,127

(22) Filed: Jul. 9, 2002

(65) Prior Publication Data

US 2004/0007250 A1 Jan. 15, 2004

(51) Int. Cl.[7] ................................................. B08B 1/00
(52) U.S. Cl. ......................................... 15/210.1; 15/231
(58) Field of Search ............................. 15/209.1, 210.1, 15/231; 206/389, 395, 409, 494

(56) References Cited

U.S. PATENT DOCUMENTS

| 579,850 | A | * | 3/1897 | Uhlmann | 34/95.4 |
| 2,585,061 | A | * | 2/1952 | Wester, Jr. | 15/231 |
| 2,880,442 | A | * | 4/1959 | Shelby | 15/231 |
| 3,613,146 | A | * | 10/1971 | Oviatt | 15/231 |
| 4,152,803 | A | * | 5/1979 | Giersin et al. | 15/104.94 |
| 4,873,728 | A | * | 10/1989 | Bono | 4/233 |
| 6,098,239 | A | * | 8/2000 | Voshikian | 15/228 |

FOREIGN PATENT DOCUMENTS

TW          382992          5/1988

* cited by examiner

*Primary Examiner*—Mark Spisich
(74) *Attorney, Agent, or Firm*—Mark W. Croll, Esq.; Donald J. Breh, Esq.; Welsh & Katz, Ltd.

(57) ABSTRACT

A device for cleaning fiber optic components includes a container having an opening with a soft, large work surface formed in a side thereof. The device includes a plurality of cleaning wipes located within the container, allowing the wipes to be fed from the inside of the container through the opening and placed on the work surface for cleaning. A method for cleaning fiber optic components is also disclosed.

8 Claims, 1 Drawing Sheet